C. A. PARSONS & A. H. LAW.
REGULATION OF DYNAMO ELECTRIC MACHINERY.
APPLICATION FILED MAY 15, 1908.

978,638.

Patented Dec. 13, 1910.
2 SHEETS—SHEET 1.

ATTEST

INVENTORS
CHARLES A. PARSONS.
ALEXANDER H. LAW.

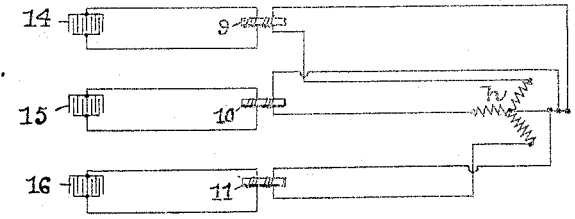
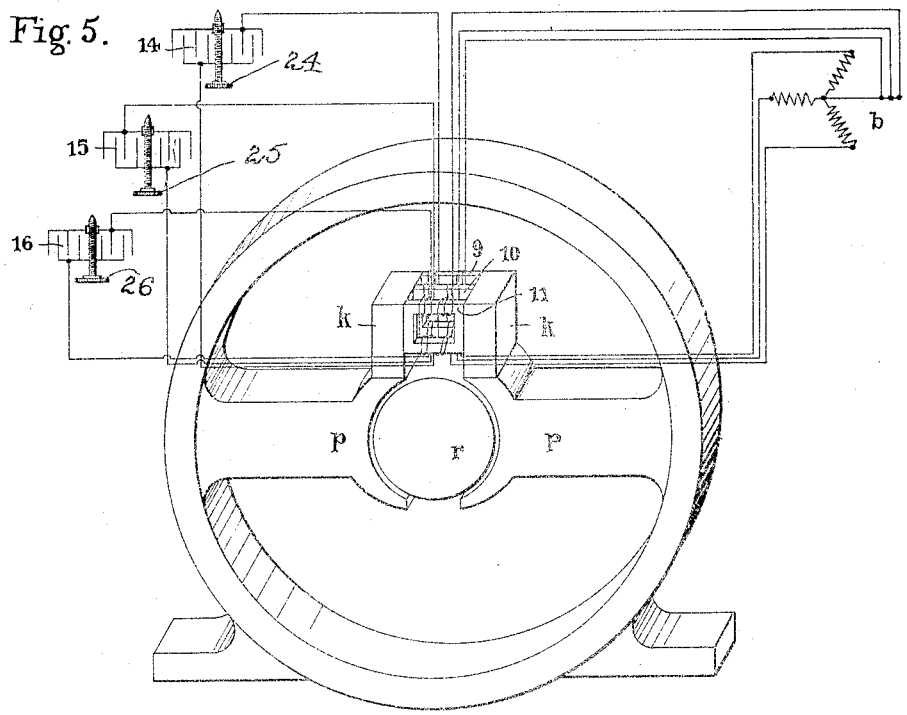
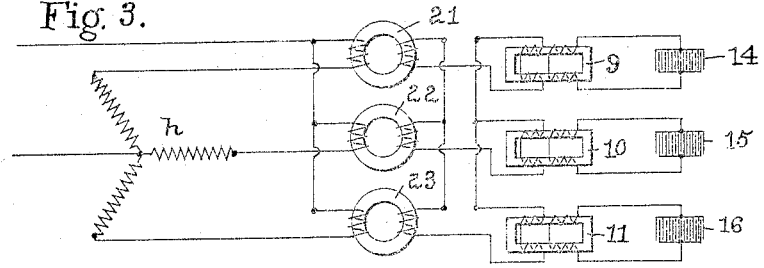

UNITED STATES PATENT OFFICE.

CHARLES ALGERNON PARSONS AND ALEXANDER HENRY LAW, OF NEWCASTLE-UPON-TYNE, ENGLAND; SAID LAW ASSIGNOR TO SAID PARSONS.

REGULATION OF DYNAMO-ELECTRIC MACHINERY.

978,638.   Specification of Letters Patent.   Patented Dec. 13, 1910.

Application filed May 15, 1908. Serial No. 433,126.

*To all whom it may concern:*

Be it known that we, CHARLES ALGERNON PARSONS and ALEXANDER HENRY LAW, subjects of the King of Great Britain and Ireland, residing at Heaton Works, Newcastle-upon-Tyne, in the county of Northumberland, England, have invented certain new and useful Improvements in and Relating to the Regulation of Dynamo-Electric Machinery, of which the following is a specification.

This invention relates to the regulation of alternators, dynamos and the like, and has for its object to improve the regulation of voltage of one, two or more phase machines and also rotary converters, that is, machines for converting from one, two or more phases to continuous current and to provide means for easy adjustment of the apparatus to meet different working conditions.

In Patent No. 925499 dated 22nd June, 1909, Charles Algernon Parsons and Alexander Henry Law, there is described means for improving the regulation of alternators and dynamos by the use of a leakage path having a winding through which alternating current is passed. It is found, however, that in alternators with two or more phases the insertion of a leakage path winding in one phase only causes an inequality of the phases and for many reasons this inequality may prove objectionable.

The present invention consists in providing separate leakage paths governed by all or part of the phases and in regulating the effect of the leakage paths by varying the current passing around the leakage paths; for instance, in a three-phase alternator there may be three leakage paths, one connected to each phase, and also, in cases where a wire is led from the star connection another leakage path may be provided in that if desired.

The invention further consists in regulating the effect of the leakage path by providing a secondary winding on the leakage path and by varying the effect of such leakage path by varying the electrical constants such as capacity, inductance or resistance of the circuit containing such secondary winding.

Figure 1:
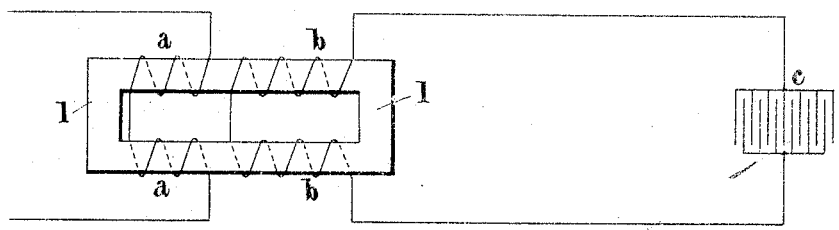
Figure 2:
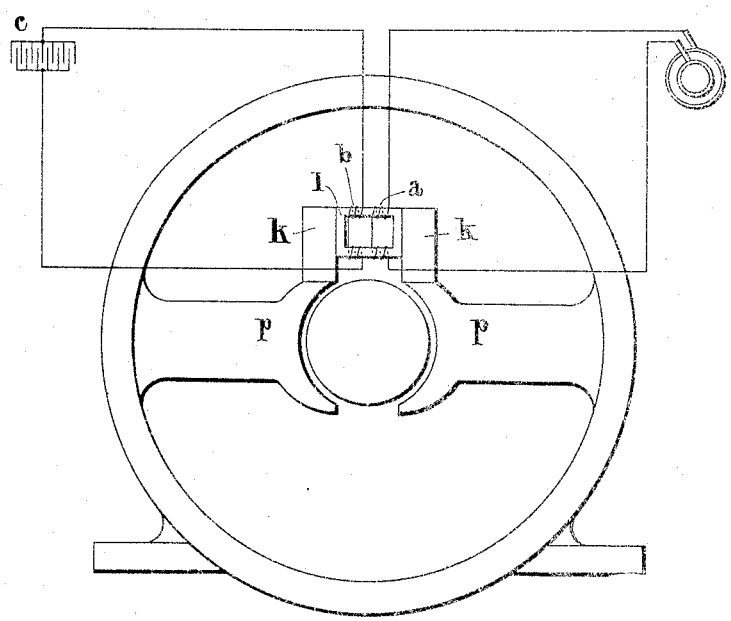

Referring to the accompanying diagrammatic drawings, Figure 1 is a view showing diagrammatically one form of the invention: Fig. 2 is an elevation showing the leakage path applied to the exciting magnets of an alternator; Fig. 3 shows diagrammatically the application of the invention to a three-phase machine, Fig. 4 being a plan showing the arrangement of the leakage paths, and Fig. 5 an elevation of the same.

In the arrangement illustrated in Figs. 1 and 2 the leakage path $l$ is inserted between the projections $k$ on the poles $p$ of the exciting magnets. Alternating current is passed through a winding $a$ on the leakage path and a secondary winding $b$ is also provided on the leakage path, which is conveniently made so as to form a closed magnetic circuit. The secondary winding $b$ on the leakage path is closed through a circuit including means such as a capacity $c$ for varying the electrical constants of the circuit. It will be seen that if the capacity be varied the alternating current in the secondary winding will vary, causing a variation in the magnetic flux which will pass through the magnetic material of the leakage path $l$ so that variation of the capacity $c$ will produce a variation of the flux passing through the armature $r$ of the exciter between the poles $p$.

In the arrangement illustrated in Figs. 3, 4 and 5 three leakage paths 9, 10, 11 are provided between projections $k$ on the poles of the exciting magnets, and three windings are provided on the three phase alternator $b$ and wound on the leakage paths respectively. Three windings are also provided on the leakage paths corresponding with the three capacities 14, 15, 16 and forming three circuits, each of which includes one of the capacities 14, 15, 16, which may be varied by any suitable means such as screw devices 24, 25, 26 illustrated. Alternating current proportional to the load is supplied to the primary windings on the leakage paths from the transformers 21, 22 and 23.

In the devices illustrated the leakage paths are arranged on one side of the pole pieces. They can, however, be so distributed that some are situated between one pair of pole horns and some between another pair of pole horns, or they are all arranged on both sides. Their windings can be arranged either in series or in parallel with one another, and in the case of multipolar machines are arranged either all in series or all in parallel with one another. Some poles also may be provided with leakage paths, some connected to one phase and some to another phase. As a matter of fact, the distribution of the leakage paths can be effected in any desired manner; but it is preferable so to arrange that the leakage between each pair of poles on the exciter or main magnets is approximately the same value, so as to equalize the effect on the field as much as possible and to obtain the same value in each phase. The amount of compounding given by these leakage paths can be varied by varying the number of the leakage paths. For instance, in some cases if a three phase plant be run on non-inductive load only, the windings on one or two leakage paths may be used, while the others are short circuited or rendered inoperative. For a power factor corresponding to a phase difference of 80 degrees three leakage paths may be employed.

In many cases it is preferable to combine two or more phases in one or more transformers, and to feed one or more leakage paths from these transformers. In a three phase machine for example, the three phase current may be converted into one phase current, the strength of which is dependent on the currents of all three phases, and then this current may be used for feeding one or more leakage paths.

Having now described our invention, what we claim as new and desire to secure by Letters Patent is:—

1. Means for regulating the voltage of alternating current machines comprising in combination, field magnets having poles, magnetic material connecting said poles, a primary winding on said magnetic material, a circuit including a secondary winding on said magnetic material, and means for varying the electrical constants of said circuit.

2. Means for regulating the voltage of polyphase alternating current machines, comprising in combination, field magnets having poles, a plurality of paths of magnetic material connecting said poles, windings on said paths of magnetic material, and means for supplying alternating current of different phases to said windings.

3. Means for regulating the voltage of polyphase alternating current machines, comprising in combination, field magnets having poles, a plurality of paths of magnetic material connecting said poles, primary windings on said paths of magnetic material, circuits including secondary windings on said paths, means for varying the electrical constants of said circuits, and means for supplying alternating current of different phases to said primary windings.

In testimony whereof, we affix our signatures in presence of two witnesses.

CHARLES ALGERNON PARSONS.
ALEXANDER HENRY LAW.

Witnesses:
HENRY GRAHAM DAKYNS,
WILLIAM MENZIES JOHNSTON.